US008645379B2

(12) United States Patent
Burnand et al.

(10) Patent No.: US 8,645,379 B2
(45) Date of Patent: Feb. 4, 2014

(54) CONCEPTUAL TAGGING WITH CONCEPTUAL MESSAGE MATCHING SYSTEM AND METHOD

(75) Inventors: Gerald Burnand, Vista, CA (US); Gavin Matthews, Encinitas, CA (US); Michael Pool, Vienna, VA (US); Rob J. Clark, Mana (NZ)

(73) Assignee: Vertical Search Works, Inc., Carlsbad, CA (US)

( * ) Notice: Subject to any disclaimer, the term of this patent is extended or adjusted under 35 U.S.C. 154(b) by 55 days.

(21) Appl. No.: 12/897,649

(22) Filed: Oct. 4, 2010

(65) Prior Publication Data
US 2012/0011120 A1 Jan. 12, 2012

Related U.S. Application Data

(63) Continuation-in-part of application No. 12/589,068, filed on Oct. 16, 2009, now Pat. No. 8,195,666, and a continuation of application No. 11/789,474, filed on Apr. 25, 2007, now Pat. No. 7,606,810.

(60) Provisional application No. 60/795,527, filed on Apr. 27, 2006.

(51) Int. Cl.
G06F 17/30 (2006.01)

(52) U.S. Cl.
USPC ........................................................ 707/737

(58) Field of Classification Search
USPC ......... 707/732, 733, 734, 706, 749, 737, 738, 707/822; 715/760, 781; 709/219
See application file for complete search history.

(56) References Cited

U.S. PATENT DOCUMENTS

| 6,601,075 | B1 | 7/2003 | Huang et al. |
| 7,076,484 | B2 | 7/2006 | Dworkis et al. |
| 7,240,067 | B2 * | 7/2007 | Timmons ............................. 1/1 |
| 7,516,123 | B2 * | 4/2009 | Betz et al. ............................ 1/1 |
| 7,827,125 | B1 * | 11/2010 | Rennison ....................... 706/14 |
| 7,836,060 | B1 * | 11/2010 | Rennison ...................... 707/749 |
| 7,870,117 | B1 * | 1/2011 | Rennison ...................... 707/706 |
| 8,001,064 | B1 * | 8/2011 | Rennison ....................... 706/14 |
| 8,060,518 | B2 * | 11/2011 | Timmons ..................... 707/755 |
| 2001/0021934 | A1 | 9/2001 | Yokoi |
| 2002/0147578 | A1 | 10/2002 | O'Neil et al. |
| 2002/0169771 | A1 | 11/2002 | Melmon et al. |
| 2003/0212954 | A1 * | 11/2003 | Patrudu ........................ 715/513 |
| 2003/0217052 | A1 | 11/2003 | Rubenczyk et al. |
| 2005/0091200 | A1 | 4/2005 | Melton et al. |
| 2006/0047632 | A1 | 3/2006 | Zhang |
| 2009/0024574 | A1 * | 1/2009 | Timmons ......................... 707/3 |

FOREIGN PATENT DOCUMENTS

WO WO 00/77690 12/2000

OTHER PUBLICATIONS

PCT/US06/33222, International Search Report, Jun. 24, 2008.
PCT/US06/33222, Written Opinion, Jun. 24, 2008.
EP 06 802 319.1, EP Search Report, Feb. 2, 2010.
PCT/US11/54822, International Search Report, Nov. 14, 2011.
PCT/US11/54822, Written Opinion, Nov. 14, 2011.

* cited by examiner

Primary Examiner — Jean M Corrielus
(74) Attorney, Agent, or Firm — DLA Piper LLP (US)

(57) ABSTRACT

A conceptual tagging and message matching system and method are provided. In one example, the system and method generate web pages or third party web pages with pieces of content combined with the message.

48 Claims, 18 Drawing Sheets

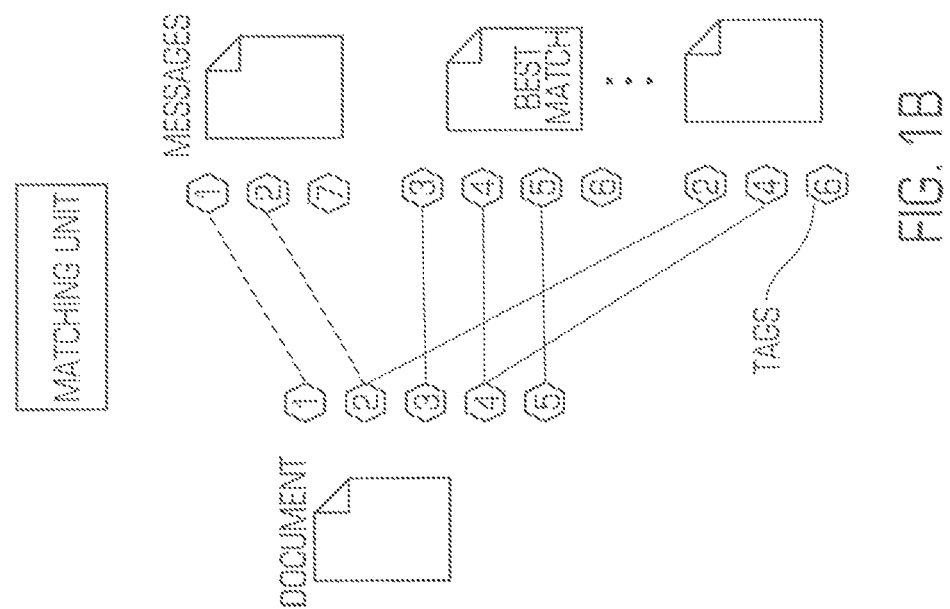

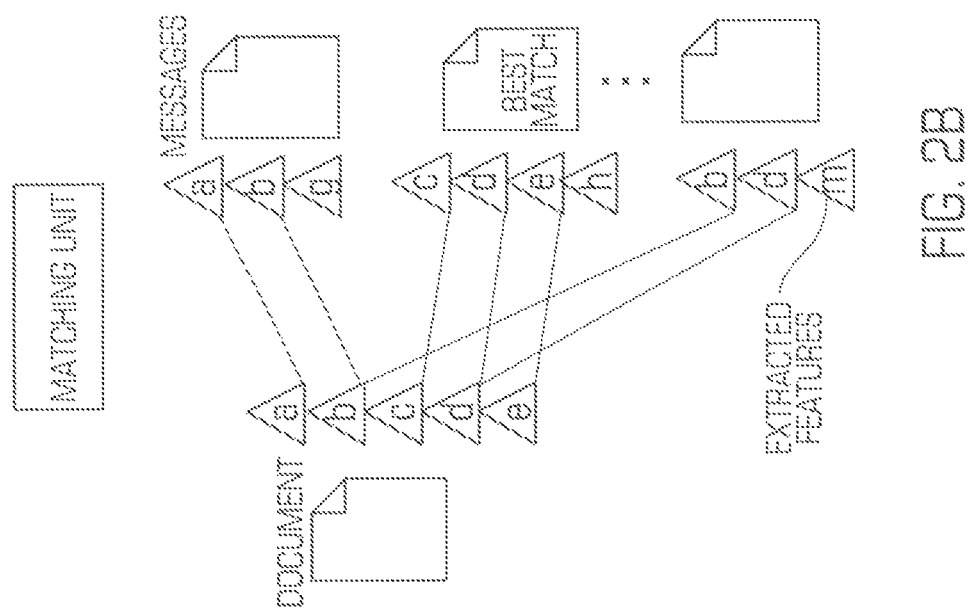

DATURA: ANGEL'S TRUMPET OR DEVIL'S POISON?

MASTERS WOULD PROBABLY BE SURPRISED TO LEARN THAT THE ONCE LOWLY "JIMPSON" OR JIMSONWEED HAS BEEN TRANSFORMED INTO A GARDEN FLOWER AS EXOTIC AND SWEET-SCENTED AS JESSAMINE AND WISTERIA. DATURA AND ITS TWIN BRUGMANSIA, WERE ALL THE RAGE ON GARDEN FORUMS A COUPLE OF YEARS BACK. FADS DON'T LAST LONG, HOWEVER, AND THE CURRENT BIG THING SEEMS TO BE UNUSUAL MORNING GLORIES.

DATURA BELONGS TO THE CLASSIC "WITCHES' WEEDS," ALONG WITH DEADLY NIGHTSHADE, HENBANE AND MANDRAKE. MOST PARTS OF THE PLANTS CONTAIN TOXIC HALLUCINOGENS, AND DATURA HAS A LONG HISTORY OF USE FOR CAUSING DELIRIOUS STATES AND DEATH. IT WAS WELL KNOWN AS AN ESSENTIAL INGREDIENT OF LOVE POTIONS AND WITCHES' BREWS.

STILL DATURA BOASTS SOME OF THE LARGEST AND SHOWIEST BLOOMS AVAILABLE ON AN EASY-TO-GROW ANNUAL. THESE TRUMPET SHAPED FLOWERS OPEN IN THE EVENING TO ATTRACT MOTHS, AND USUALLY REMAIN FRESH INTO THE FOLLOWING MORNING—UNTIL THE DAY HEATS UP. I'VE GROWN SEVERAL VARIETIES, AND THINK THE PRETTIEST IS THE DOUBLE PURPLE SOMETIMES KNOWN AS BLACKCURRANT SWIRL. DATURA DISCOLOR, A SINGLE WHITE TYPE WITH A PURPLE CENTER, IS ALSO STRIKING.

THE NAME DERIVES FROM THE HINDU "DHATURA" WHICH WAS APPLIED TO THE NATIVE TYPE IN INDIA—FASTUOSA, AKA TATOREA. ALTHOUGH MOST OF THE DATURAS SEEM TO HAVE ORIGINATED IN THE AMERICAS, STRAMONIUM I THE INFAMOUS JIMSONWEED, ALSO NATIVE TO PARTS OF EUROPE AND FEROX TO CHINA. STRAMONIUM COMBINES THE GREEK STRYCHNOS (NIGHTSHADE) AND MANIKOS ("MAD"). OTHER NICKNAMES FOR DATURA INCLUDE THORN-APPLE, DEVIL'S APPLE, DEVIL'S TRUMPET, ANGEL'S TRUMPET, STINKWEED, GREEN DRAGON, APPLE OF PERU AND TOLOACHE (THE LATTER PROBABLY REFERRING ONLY TO DATURA INOXIA).

EMPTY SPACE WHERE ADVERTS WILL BE DISPLAYED

CONCEPTUAL TAGGING WITH CONCEPTUAL MESSAGE MATCHING SYSTEM AND METHOD

PRIORITY CLAIMS/RELATED APPLICATIONS

This application claims priority under 35 USC 120 and is a continuation in part application of U.S. patent application Ser. No. 12/589,068 filed on Oct. 16, 2009 whose title is "Editorial related advertising content delivery system" which in turn claims priority under 35 USC 120 and is a continuation application of U.S. patent application Ser. No. 11/789,474 filed on Apr. 25, 2007 whose title is "Editorial related advertising content delivery system" (now U.S. Pat. No. 7,606,810 issued on Oct. 20, 2009) which in turn claims the benefit under 35 USC 119(e) to U.S. Provisional Patent Application Ser. No. 60/795,527 filed on Apr. 27, 2006 whose title is "Editorial related advertising content delivery system" (now expired), all of which are incorporated herein by reference.

FIELD

The field of the disclosure relates to a system and method for delivering messages to users using conceptual tagging that matches messages to the content requested by the user.

BACKGROUND

Advertisements that are embedded into web pages are well known and various methods and systems are used to select the advertisements that are displayed on the web page. Early systems simply displayed the advertisements to users without any targeting so that a user would often ignore the advertisement (not click on it). Later developed systems have attempted to target specific advertisements to particular users based on keywords. For example, some systems match an advertisement against an article based on keywords that may appear. Such a system is the Google® Ad Sense system. In the Google® Ad Sense system, an advertiser must review and select a set of keywords, bid on Google showing their advertisement when those keywords appear in an article and then have their advertisement appear when they have the winning bid for a particular keyword. However, this system requires the user to manually review and select one or more keywords as well as provide bids which is complicated. It is desirable to provide a system and method in which it is easier for an advertiser to select an area in which they want their advertisements to be targeted and also to a system that better targets advertisements to users, and it is to this end that the disclosure is directed.

BRIEF DESCRIPTION OF THE DRAWINGS

FIG. 1*b* illustrates an example of the matching process between a piece of content and one or more messages in which tags are compared and messages are ranked according to the number of matching tags and their weights;

FIG. 2*b* illustrates an example of the matching process between a piece of content and one or more messages in which indexed features are compared directly and messages are ranked according to the number of matching features and their weights;

FIG. 5 illustrates an example of a piece of content to which an advertisement is matched using the conceptual tagging and advertisement matching system;

FIG. 7 illustrates an example of an advertisement that is matched to a piece of content using the conceptual tagging and advertisement matching system;

FIG. 16 illustrates a third example of a website with a piece of content and the real-time generated advertisements from the conceptual tagging and advertisement matching system.

DETAILED DESCRIPTION OF ONE OR MORE EMBODIMENTS

The disclosure is particularly applicable to a conceptual tagging and advertisement matching system for generating web pages or third party web pages with pieces of content combined with advertisement and the FeaturePlay feature and it is in this context that the disclosure will be described. It will be appreciated, however, that the system and method has greater utility since the system can be used to generate other types of displays/presentation to a user and may also be implemented in other manners that are within the scope of the disclosure. For example, in addition to the client/server web based architecture illustrated and described below, the conceptual tagging and advertisement matching system may be implemented on a stand-alone computer, as a software as a service (SaaS) model, on a mainframe system and the like as the disclosure is not limited to the particular architecture. In addition, the conceptual tagging and advertisement matching system and method can be used with any types of pieces of content (images, text, articles, videos, etc.) and can be used to generate various types of messages (advertisements, marketing messages, related articles, etc.) that an organization wants to deliver to a targeted audience.

Figure 1:
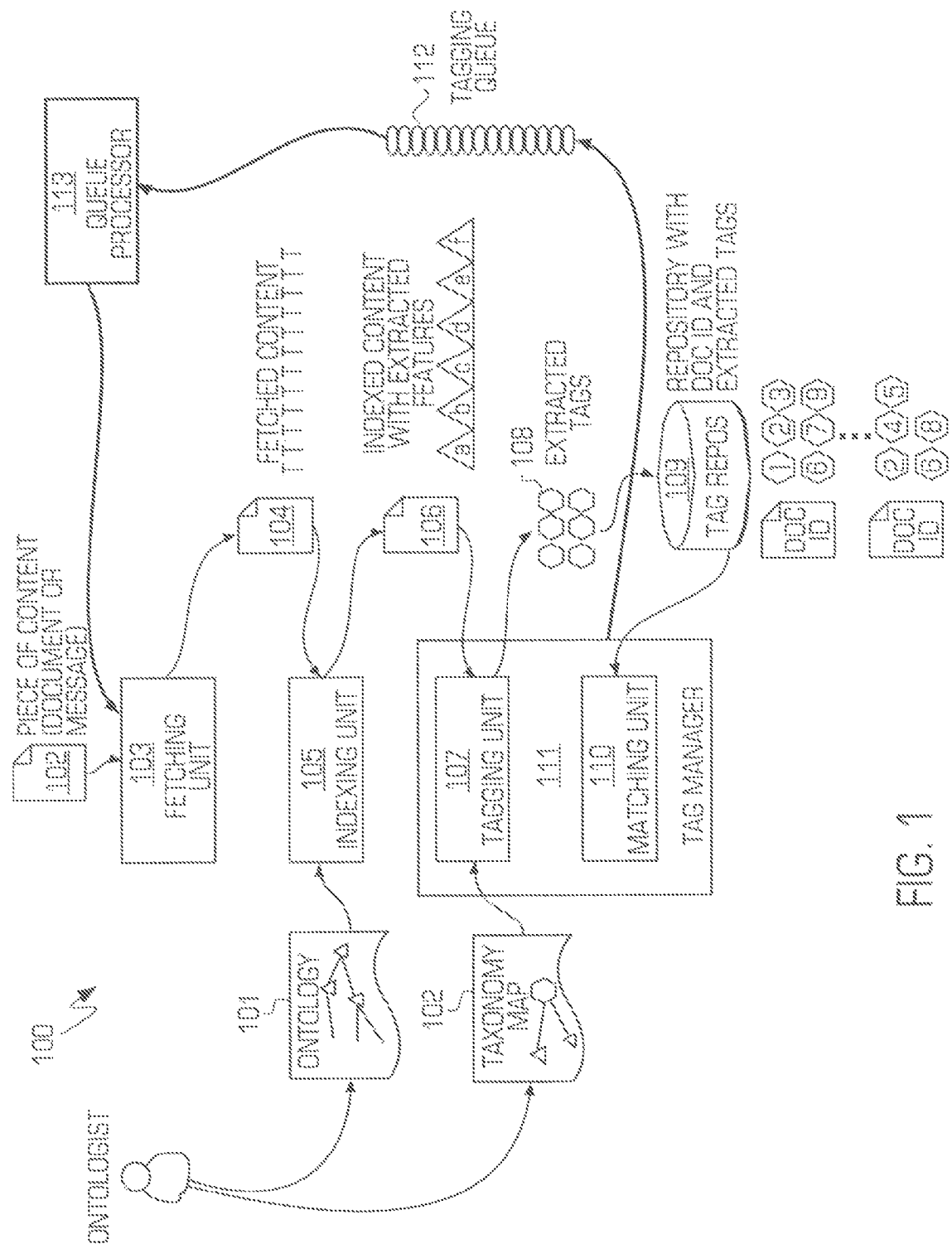
FIG. 1 illustrates an implementation of a conceptual tagging and advertisement matching system.

FIG. 1 illustrates a minimal implementation of the conceptual tagging and advertisement matching system 100. The system 100 has a Fetching Unit (103) responsible for retrieving a copy of the piece of content or message to process (102). The fetched piece of content or message (104) is passed to a semantic indexing unit (105) which uses the Ontology (101) to extracts features from the piece of content or message. The Indexing Unit (105) produces an indexed piece of content or message (106) containing extracted features (for example terms, synsets, facets, entities, depicted as triangles in FIG. 1) and optionally a copy of the document. The features extracted from the piece of content or message may be one or more of words, phrases, concepts, dynamically extracted entities, and document classification facets. The indexed piece of content or message (106) is then passed to the Tagging Unit (107) which uses the Taxonomy Map (102) to determine the tags (depicted as hexagons in FIG. 1) associated with the piece of content or message based on the extracted features (106). The Extracted Tags (106) are stored in a Tag Repository (109). In the system described herein, the concepts associated with each message are automatically determined from the extracted features so that the company who wants to pay for the message to be displayed to users do not have to select keywords. At matching time, a request (not represented in the Figure) for messages for a specific piece of content is sent to the Matching Unit (110). The Matching Unit (110) matches the tags of the piece of content in the request with tags of one or more messages in the Tag Repository (109) and selects the most relevant messages to return in response to the request. See FIG. 1b for an illustration of the matching process using tags. Additional details of the tagging process/unit and the message matching process/unit shown in FIG. 1 are provided in U.S. Pat. No. 7,606,810 and U.S. patent application Ser. No. 12/589,068 filed on Oct. 16, 2009 whose title are "Editorial related advertising content delivery system", both of which are owned by the same assignee as this patent application and both of which are incorporated herein by reference. An optional Tagging Queue (112) can be used by the Tag Manager (111) to refresh the tags associated with piece of content when the Ontology (101) or the Taxonomy Map (102) change or stale tags exist. The Queue Processor (113) takes requests from the Tagging Queue (112) and triggers the fetching, indexing, tagging and storage of the tags back in the Tag Repository (109) as described in FIG. 1.

Figure 2:
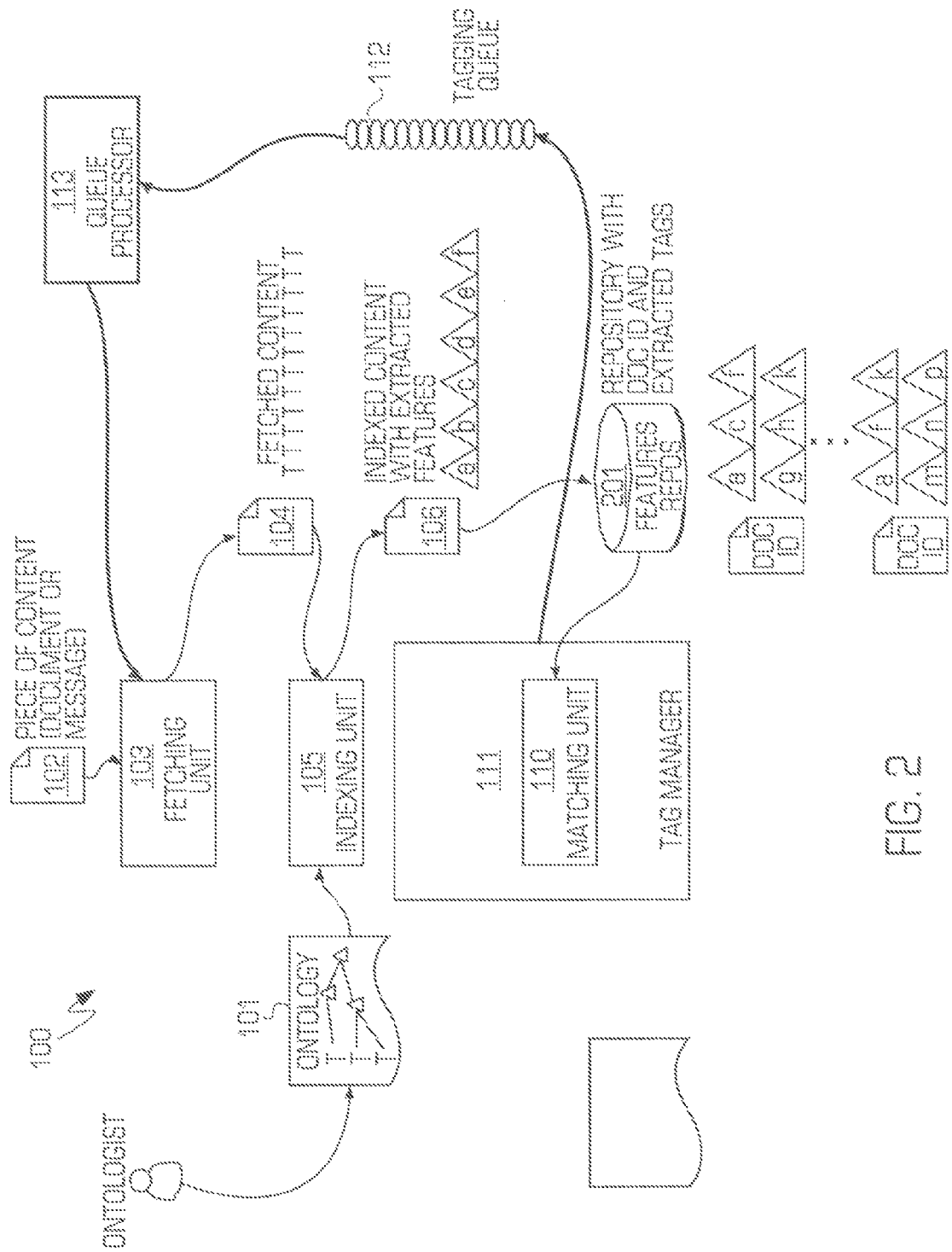
FIG. 2 illustrates another implementation of a conceptual tagging and advertisement matching system.

FIG. 2 illustrates a minimal implementation of the conceptual tagging and advertisement matching system 100. The system 100 has a Fetching Unit (103) responsible for retrieving a copy of the piece of content or message to process (102). The fetched piece of content or message (104) is passed to a semantic indexing unit (105) which uses the Ontology (101) to extracts features from the piece of content or message. The Indexing Unit (105) produces an indexed piece of content or message (106) containing extracted features (for example terms, synsets, facets, entities, depicted as triangles in FIG. 2) and optionally a copy of the piece of content or message. The Extracted Features (106) are stored in a Features Repository (201). At matching time, a request (not represented in the Figure) for messages for a specific piece of content is sent to the Matching Unit (110). The Matching Unit (110) matches the features of the piece of content in the request with features of one or more messages in the Feature Repository (201) and selects the most relevant messages to return in response to the request. See FIG. 2b for an illustration of the matching process using indexed features. Additional details of the tagging process/unit and the message matching process/unit shown in FIG. 2 are provided in U.S. Pat. No. 7,606,810 and U.S. patent application Ser. No. 12/589,068 filed on Oct. 16, 2009 whose title are "Editorial related advertising content delivery system", both of which are owned by the same assignee as this patent application and both of which are incorporated herein by reference. An optional Tagging Queue (112) can be used by the Tag Manager (111) to refresh the tags associated with documents when the Ontology (101) changes. The Queue Processor (113) takes requests from the Tagging Queue (112) and triggers the fetching, indexing, tagging and storage of the tags back in the Features Repository (201) as described in FIG. 2. Additional details of the concept indexing process/ unit and semantic search unit shown in FIG. 2 are provided in U.S. Pat. Nos. 7,668,825 and 7,783,668 entitled "Search System and Method" that list the first inventor as Claude Vogel, both of which are owned by the same assignee as this patent application and both of which are incorporated herein by reference.

Figure 3:
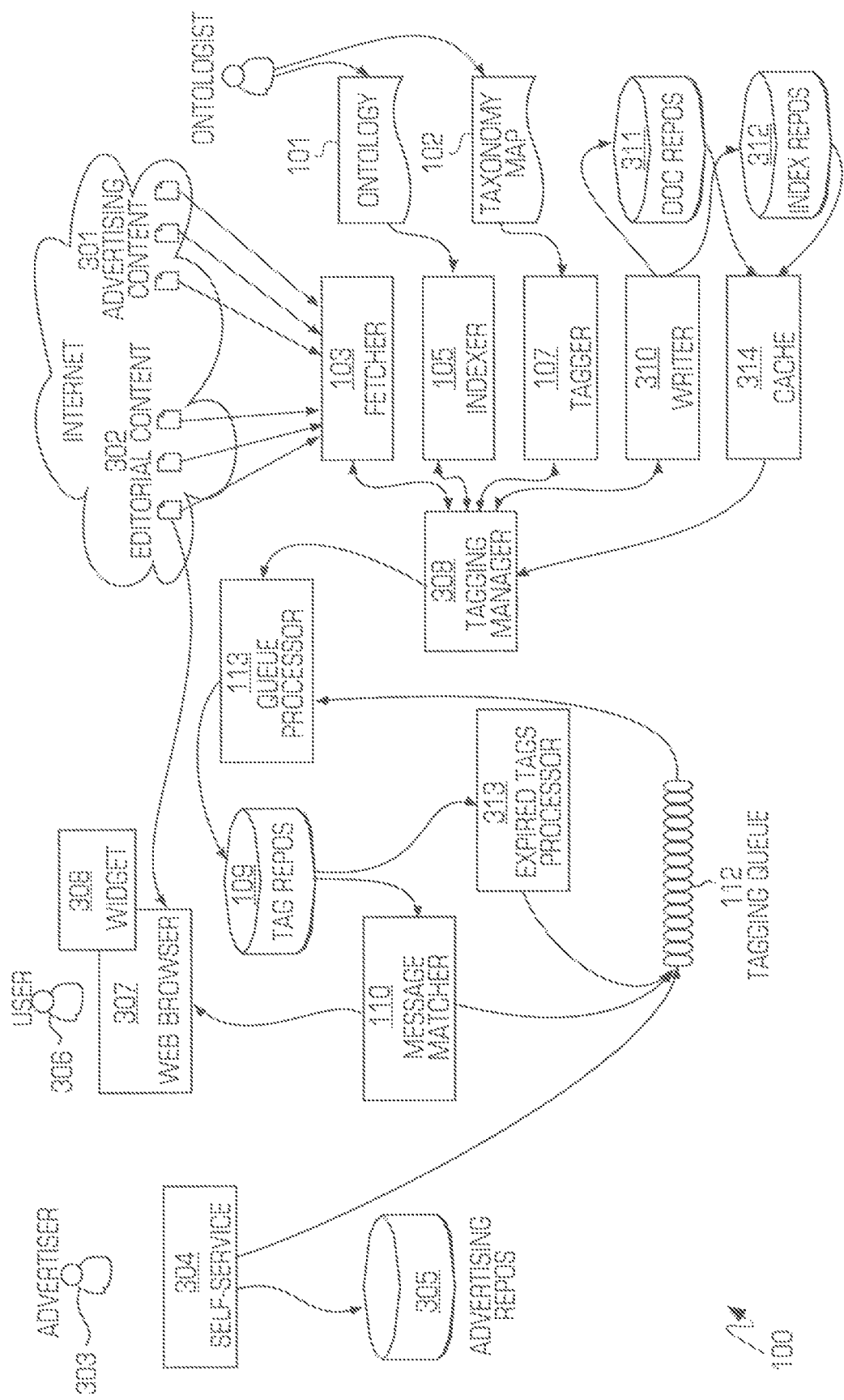
FIG. 3 illustrates an example of a first embodiment of a method for conceptual tagging and advertisement matching that may be practiced by the conceptual tagging and advertisement matching system.
Figure 9:
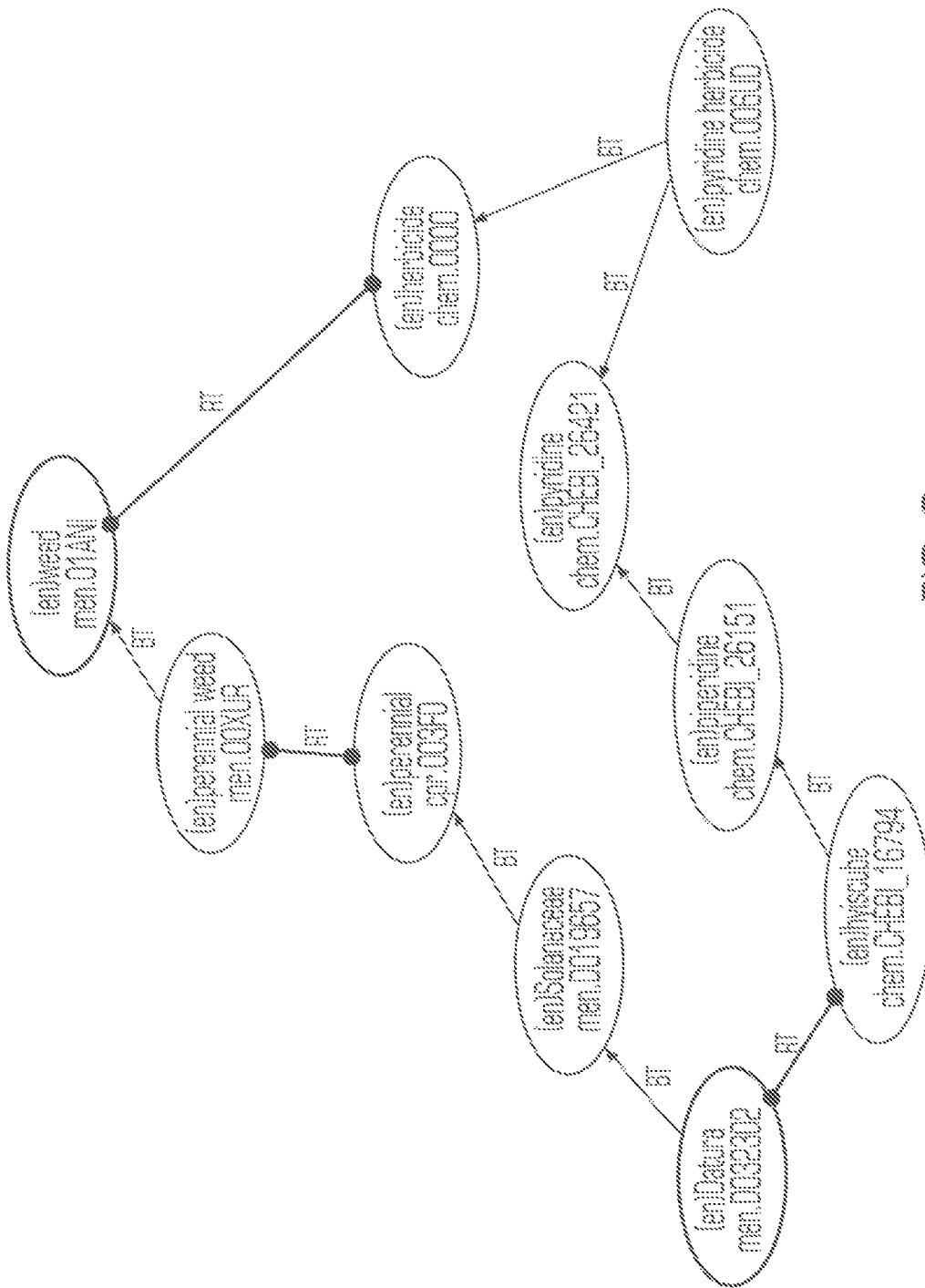
FIGS. 9 and 10 illustrates examples of the concept ontology of the semantic indexing portion of the conceptual tagging and advertisement matching system that is used to extract concepts in the piece of content and/or the advertisement.
Figure 10:
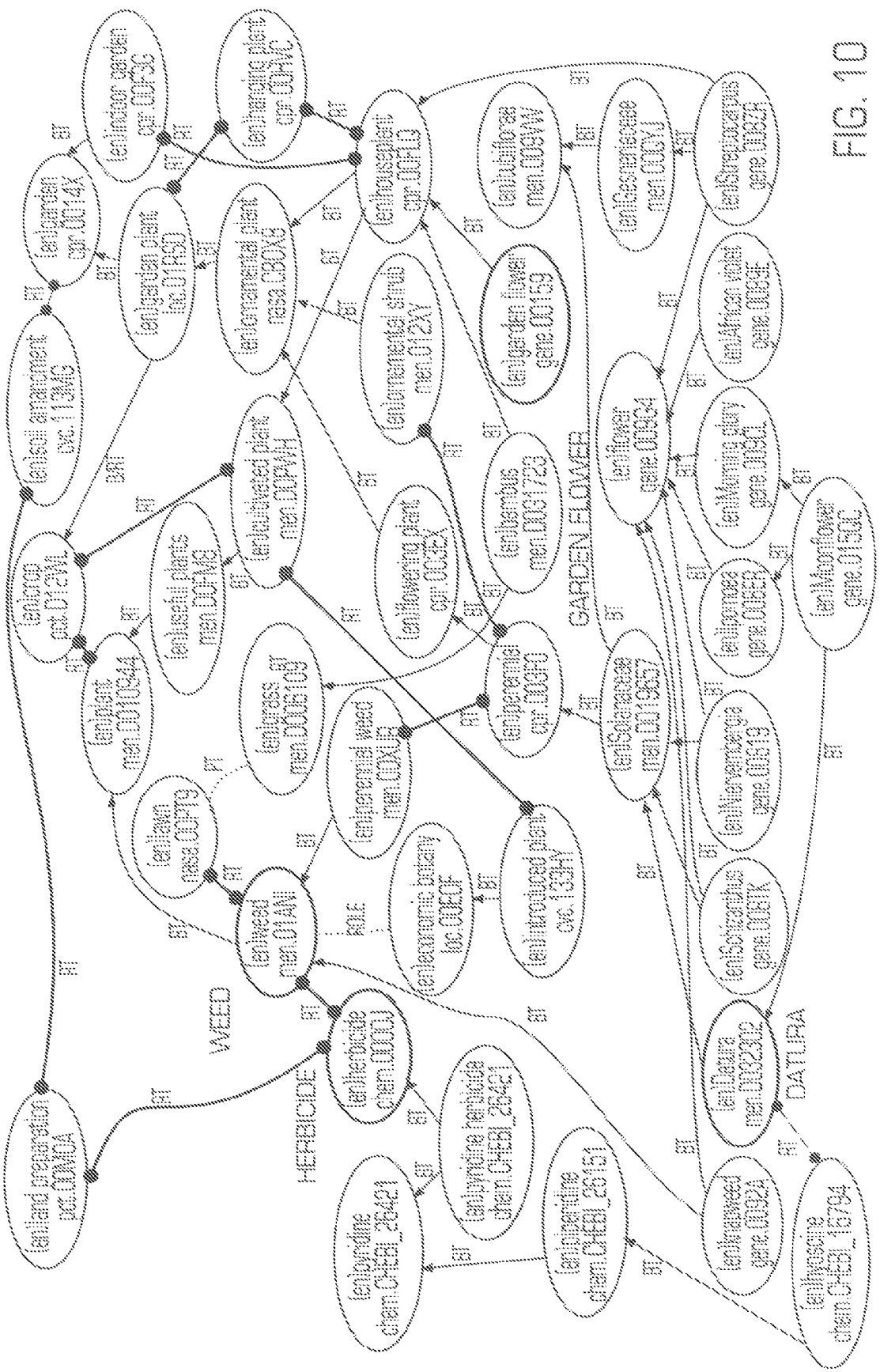

FIG. 3 illustrates an example of a first embodiment of a method for conceptual tagging and advertisement matching that may be practiced by the conceptual tagging and advertisement matching system 100 which is an automated content and advertisement tagging system that works with editorial content 304 (for example, a publisher web site) and advertising/messaging content 303 to select the most relevant messages, such as adverts, to display next to a publisher article. In the embodiments of the system described below, the units and engines may be hardware devices that perform the functions and operations described below or may be each a plurality of lines of computer code executed by one or more processing units of the system 100 that can be implemented as one or more computers. The system 100 has one or more knowledge resources in which an ontology (101) is developed either generally or for a specific application domain. The ontology can be developed by a person or automatically generated by some process not described in this patent. The ontology is a formal representation of knowledge comprising of one or more of the following document features: 1) a set of synsets arranged in one or more taxonomies, each synset containing an identifier and a list of synonym terms or expressions; 2) a semantic network linking the synsets with typed relations such as part/whole, plays a role in, is homonym, is related with; 3) one or more facets comprising an identifier and a classification rules which determines whether a document belongs to the facet; and 4) a declarative entity list comprising an entity extraction rule and a function to generate a corresponding identifier. An example of a relevant ontology and taxonomy are shown in FIGS. 9-10 for the article shown in FIG. 5. The knowledge resource of the system may also include a taxonomy map (102). It comprises a taxonomy of tags. Each tag comprises: 1) an identifier and a weight (used in the ad-matching process); and 2) a predicate including one or more document feature (term, synset, facet, entity, etc. . . . ), each document feature can optionally be associated with a weight (used in the tagging process). The ontology is described in more detail in U.S. Pat. Nos. 7,668,825 and 7,783,668 entitled "Search System and Method" that list the first inventor as Claude Vogel, both of which are owned by the same assignee as this patent application and both of which are incorporated herein by reference, and the taxonomy map is described in more detail in U.S. Pat. No. 7,606,810 entitled "Editorial related advertising content delivery system".

Figure 7:
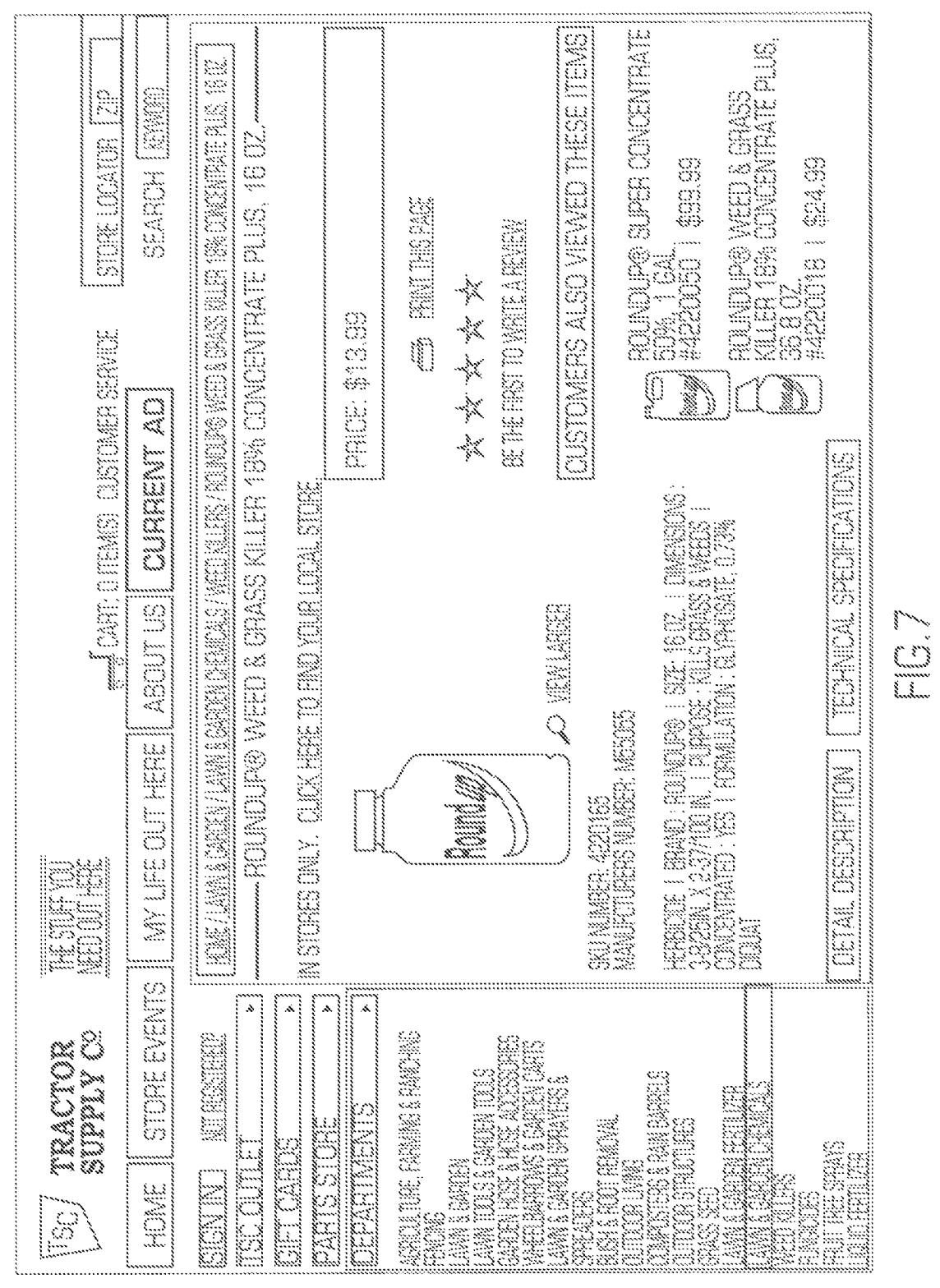
Figure 8:
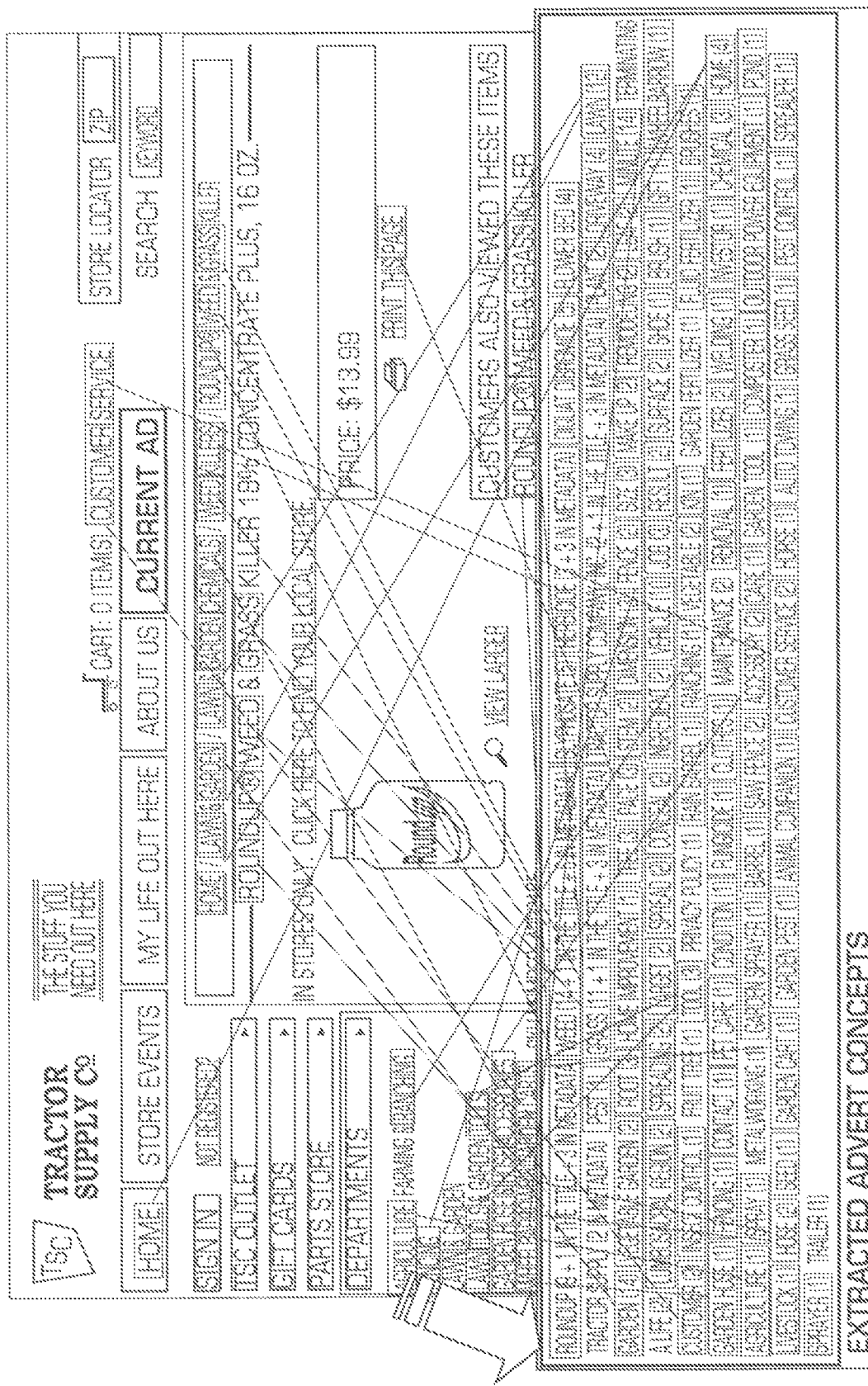
FIG. 8 illustrates an example of the concepts extracted from the advertisement in FIG. 7 using the semantic indexing portion of the conceptual tagging and advertisement matching system.

The system 100 may also perform advertising content tagging (Adverts) in which advertising content (adverts) (301) and editorial content (articles/web sites, pieces of content, etc.) (302) must be available to the system 100 through some mechanism, such as Hypertext Transfer Protocol (HTTP). The same processing is applied to advertising content and editorial content in the way described below. The advertising content is processed immediately when an advertiser defines a new advert in the system (303) and the advertiser registers and creates an advert in the Self Service application (304). A notification is added to the Tagging Queue (112) and the request will be processed asynchronously by the Queue Processor (113). An example of the message/advertisement used is shown in FIG. 7 and an example of the extracted advertisement/message features is shown in FIG. 8. In order for the message/advertisement matcher 110 to select the candidate adverts relevant to a given article/website or piece of content, all candidate adverts that will participate in the ad matching process must have been tagged, as well as the article for which ads are sought.

In the system 100, the editorial content tagging are processed, but the system does not perform ahead-of-time crawling of editorial content. In the system, the first time a user (306) views an article/piece of content using a web browser (307), the widget (308)—a piece of executable code running in the web browser—makes a call to the Message/Ad Matcher (110) to retrieve a list of suitable messages to display based on the piece of content. An example of editorial content/piece of content that is tagged by the system is shown in FIG. 5. The message/ad Matcher (110) first attempts to find the tags associated with the article already stored in the Tag Repository (109). If tags for this article are found, the message/ad Matcher uses the found tags to select the most relevant adverts for the piece of content/article. If the tags had expired, the message/ad Matcher queues a request to the Tagging Queue (112) to retag this piece of content/article. If the tags were not found in the Tag Repository, the Ad Matcher will return no message/advert, or a selection of default messages/adverts (the selection of which is not described here) and also queues a request to the Tagging Queue (112) to tag the particular piece of content/article.

Figure 6:
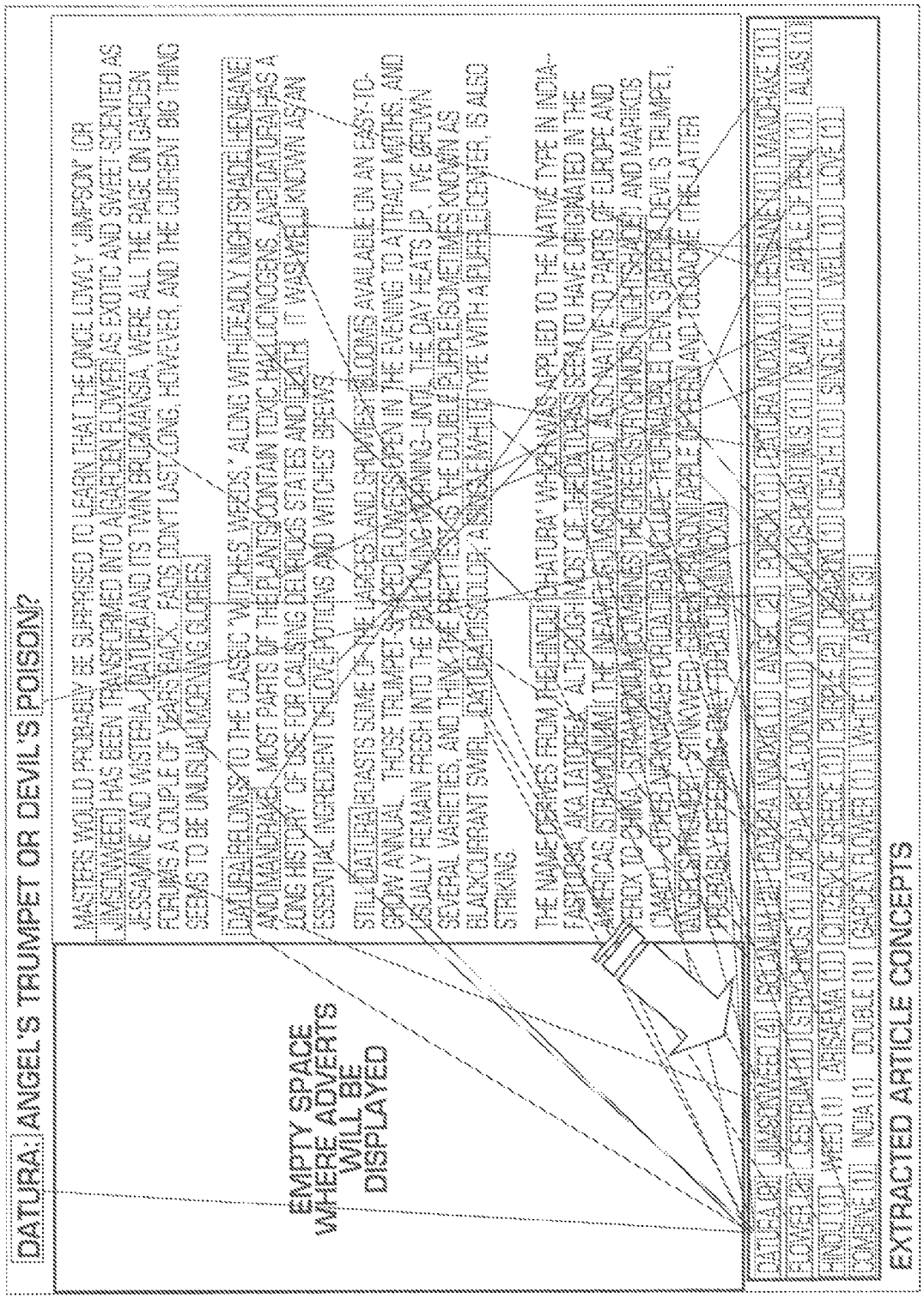
FIG. 6 illustrates an example of the concepts extracted from the piece of content in FIG. 5 using the semantic indexing portion of the conceptual tagging and advertisement matching system.

The queue processor (113) monitors the Tagging Queue (112) and for each entry in the queue, the Tagging Processor fetches the tagging request from the queue. The request contains the address of the piece of content/document to tag. In the case of Hypertext Transfer Protocol, this would be a URL. The Queue Processor requests tags for the given URL from the Tagging Manager (309). The tagging manager (309) coordinates the activities of the Fetcher, Indexer, Tagger and optionally a Writer and it thus first sends a request for tagging to the Fetcher (103). The Fetcher (103) uses the URL to download the content referenced by the URL and the content is either editorial content (piece of content/article) or advertising content (message/advert). The piece of content retrieved by the fetcher is returned to the Tagging Manager. The tagging manager then passes the piece of content/document to the Indexer (105). The Indexer processes the piece of content/document and extracts various features described in the ontology (101) such as terms, expressions, entities, synsets and facets. The indexer produces an indexed piece of content or message (IDOC) which contains the original piece of content or message and the list of extracted features and the resulting indexed piece of content or message is returned to the Tagging Manager. An example of the piece of content and an example of the extracted features are shown in FIG. 6.

Figure 11:
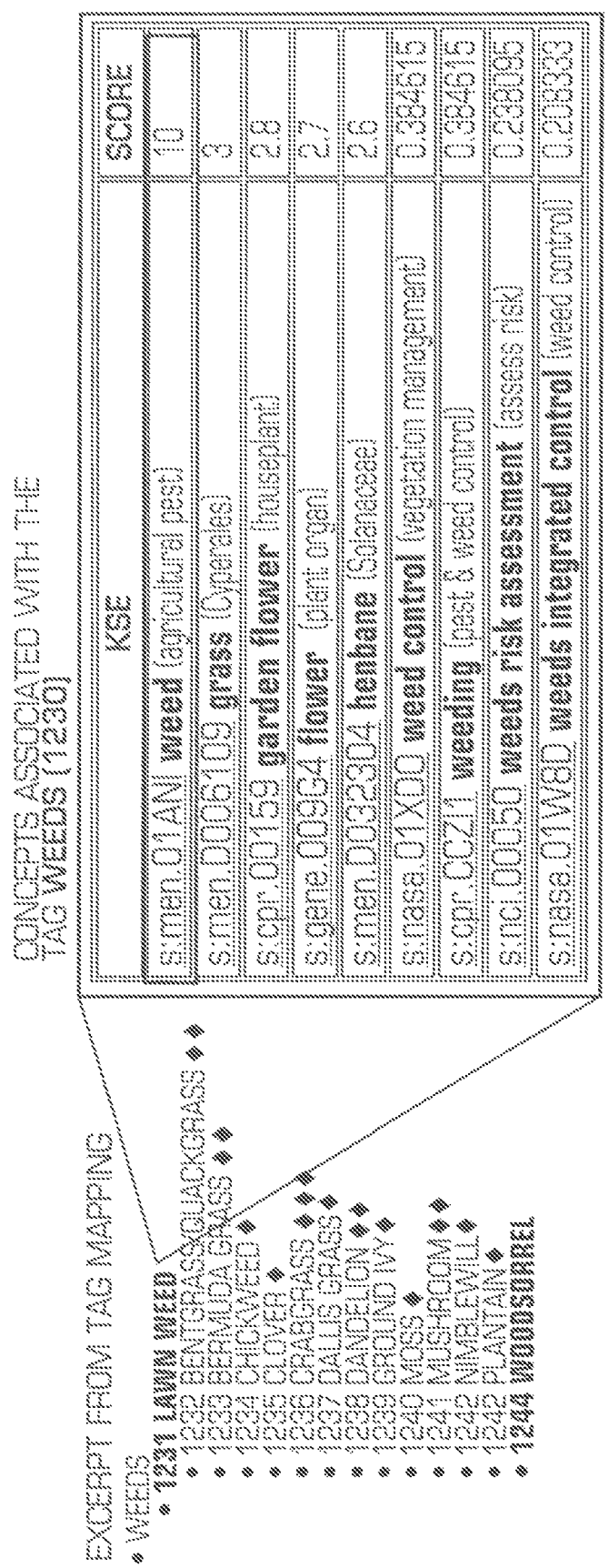
FIG. 11 illustrates an example of the taxonomy map which relates indexed features to tags that is used to determine what tags can be associated with a particular piece of content or advertisement by the tagging portion of the conceptual tagging and advertisement matching system.
Figure 12:
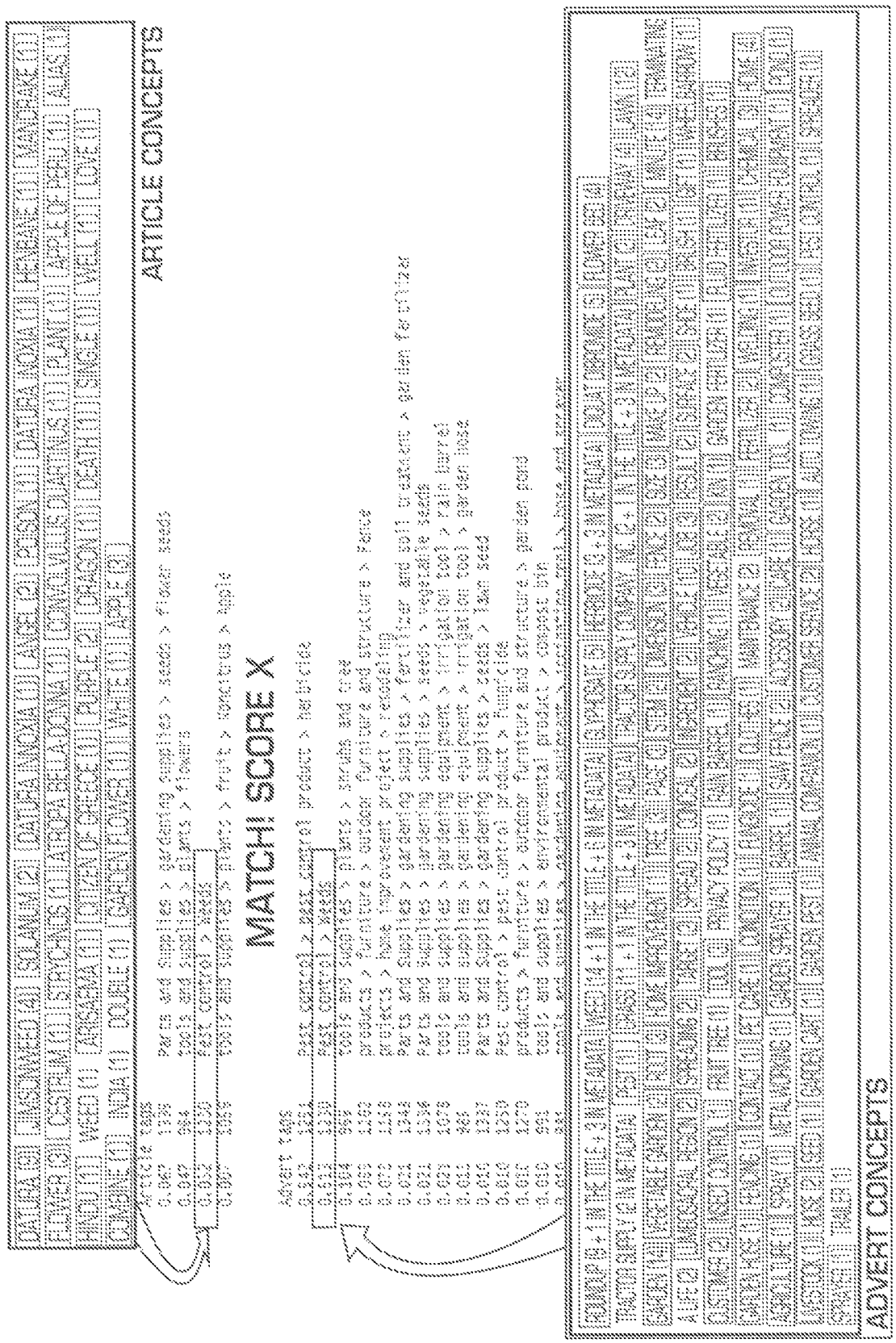
FIG. 12 illustrates an example of the concepts of the piece of content and a particular advertisement being matched using the ad matching portion of the conceptual tagging and advertisement matching system.

The tagging manager then passes the indexed piece of content or message (IDOC) to the Tagger (107) that processes the indexed piece of content or message and maps the tags associated with the piece of content or message based on the description provided in the Taxonomy Map (102). The Tagger generates a list of tags and scores associated with the piece of content or message such as shown in FIG. 11. The Tagger may not process the piece of content and message in exactly the same way and it is desirable to support asymmetric behavior. For example, an advertiser may want to display an ad about gluten-free nutrition next to an article containing a recipe for bread-making; but the advertiser may not want to display an ad about bread-making next to an article about gluten-free nutrition. The resulting tags and scores are returned to the Tag Manager. The tag manager optionally sends a copy of the piece of content or message (DOC) and indexed piece of content or message (IDOC) to a Writer (310) that stores a copy of the DOC and IDOC to some persistent repository/storage location (311 and 312) for later use (see workflow about tag expiration below). Once the tag manager has received the tags from the Tagger and optionally sent a copy of the DOC and IDOC to the Writer, it returns the tags to the Queue Processor (113) and the queue Processor writes the extracted tags into the Tag Repository (109) (for example a relational database) which completes the processing of a request from the Tagging Queue. In particular, the message matcher 110 performs the matching of the concepts in the piece of content with the concepts in the message (See FIG. 12 for example) and selects the message with the highest score and returns that message (such as an advertisement) to the user 306 using a web browser 307 to view the piece of content.

The system 100 may also have an expired tag processor (313) that monitors the Tag Repository for events that indicate that the tags are stale. For example, tags associated with a piece of content/document (article or advert) is considered stale if its expiration date has been reached (an attribute associated with each document in the Tag Repository), or if the Ontology (101) or Taxonomy Map (102) have changed. If a document's tags are expired, a request is put to the Tagging Queue (112) to re-tag the document. Tags may expire on a daily or weekly basis, depending on the rate at which the piece of content or message, ontology and taxonomy map are modified.

When re-tagging documents, the Tagging Manager (309) can optionally use the Cache (314) to retrieve documents or indexed documents to avoid having to fetch or index the document again and improve the performance of the overall system.

Figure 4:
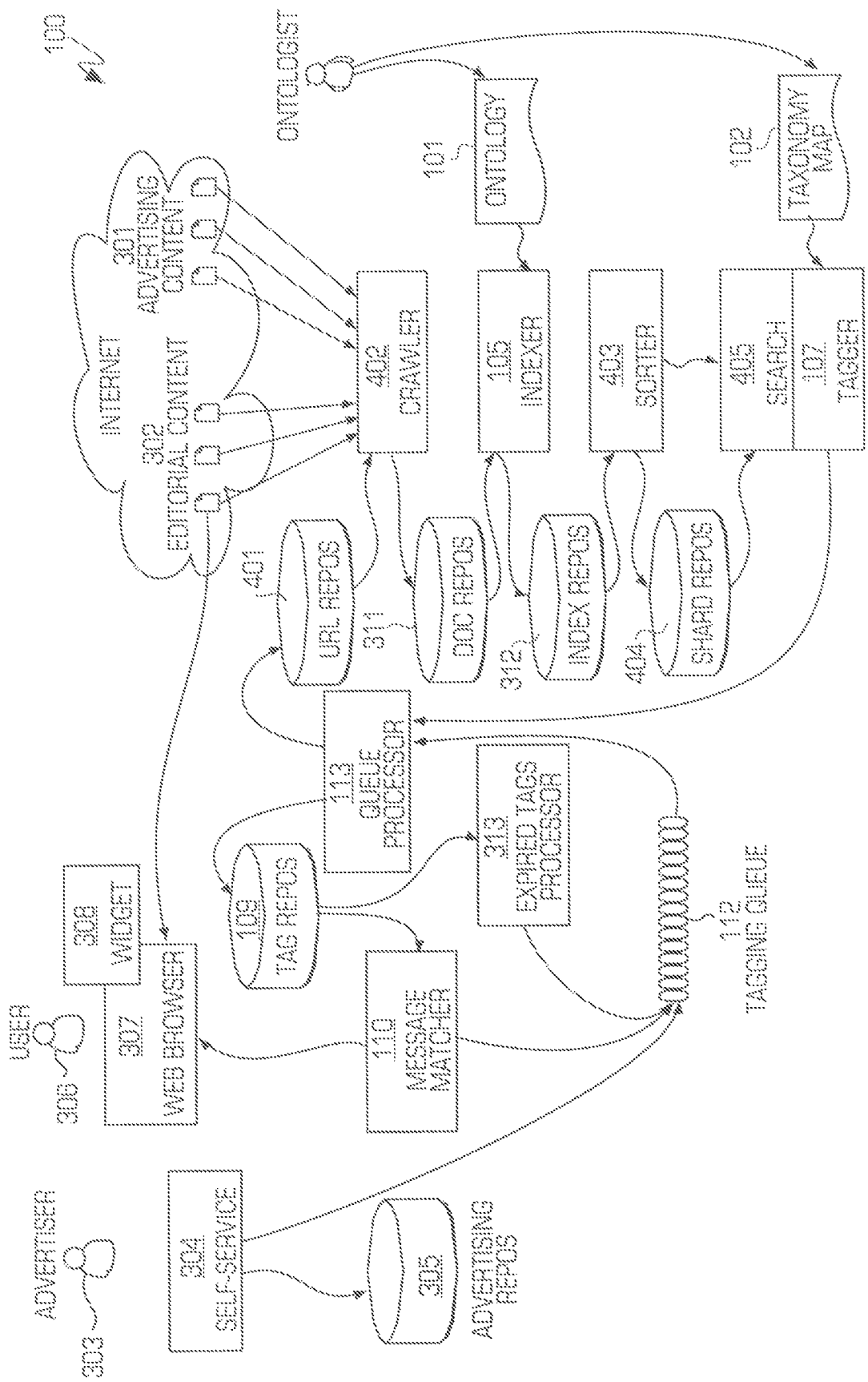
FIG. 4 illustrates an example of a second embodiment of a method for conceptual tagging and advertisement matching that may be practiced by the conceptual tagging and advertisement matching system.

FIG. 4 illustrates an example of a second embodiment of a method for conceptual tagging and advertisement matching that may be practiced by the conceptual tagging and advertisement matching system 100. The system 100 shown in FIG. 4 has many of the same elements as shown in FIG. 3 that operate and function the same way as described above. In addition, the embodiment of the system shown in FIG. 4 may further include a crawler (402), a URL repository (401), a sorter (403), a search engine (405) and a shard repository (404) wherein the search engine is a source for tagging pieces of content. In more detail, in this embodiment, the crawler (402) uses the URL of the user selected piece of content to download the content referenced by the URL wherein the piece of content is either editorial content (piece of content) or message content (advertisement). The piece of content (DOC) is retrieved by the crawler (402) based on the list of URLs to download from the URL Repository (401). Once downloaded, the document is stored in the Document Repository (311) as before.

In this embodiment, the indexer (105) processes the pieces of content and extracts various features described in the ontology (101) such as terms, expressions, entities, synsets and facets. It produces an indexed piece of content or message (IDOC) which contains the original piece of content or message and the list of extracted features. The resulting indexed piece of content or message is stored in the Index Repository (312). The sorter (403) inverts the index and produces lists of pieces of content associated with various features (e.g. terms, synsets, entities, facets) which speeds up the retrieval of piece of content matching a given query. The sorter (403) also processes the piece of content's identifier (a URL) so that the piece of content can be retrieved given its URL.

In this embodiment, the search engine (405) includes a number of services which use the Shard Repository (inverted index) (404) to find the set of documents matching a query. The shard repository is described in U.S. Pat. Nos. 7,668,825 and 7,783,668 entitled "Search System and Method" that list the first inventor as Claude Vogel, both of which are owned by the same assignee as this patent application and both of which are incorporated herein by reference. One particular query type relevant to this workflow is the query to retrieve a single piece of content given its URL.

Figure 13:
FIG. 13 illustrates an example of the piece of content being displayed with the matching advertisements using the conceptual tagging and advertisement matching system.
Figure 14:
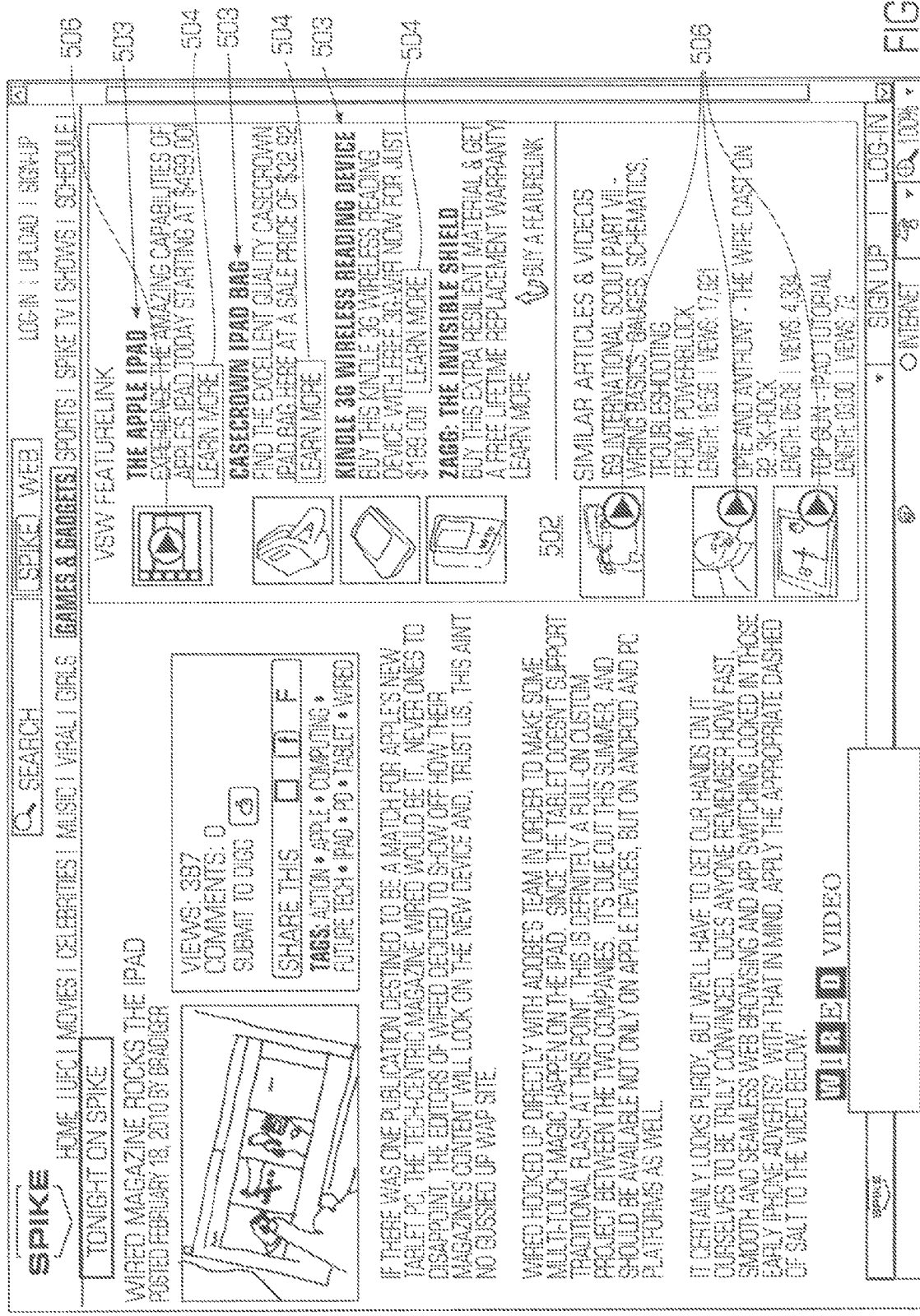
FIG. 14 illustrates a first example of a website with a piece of content and the real-time generated advertisements from the conceptual tagging and advertisement matching system including a Feature play feature.
Figure 15:
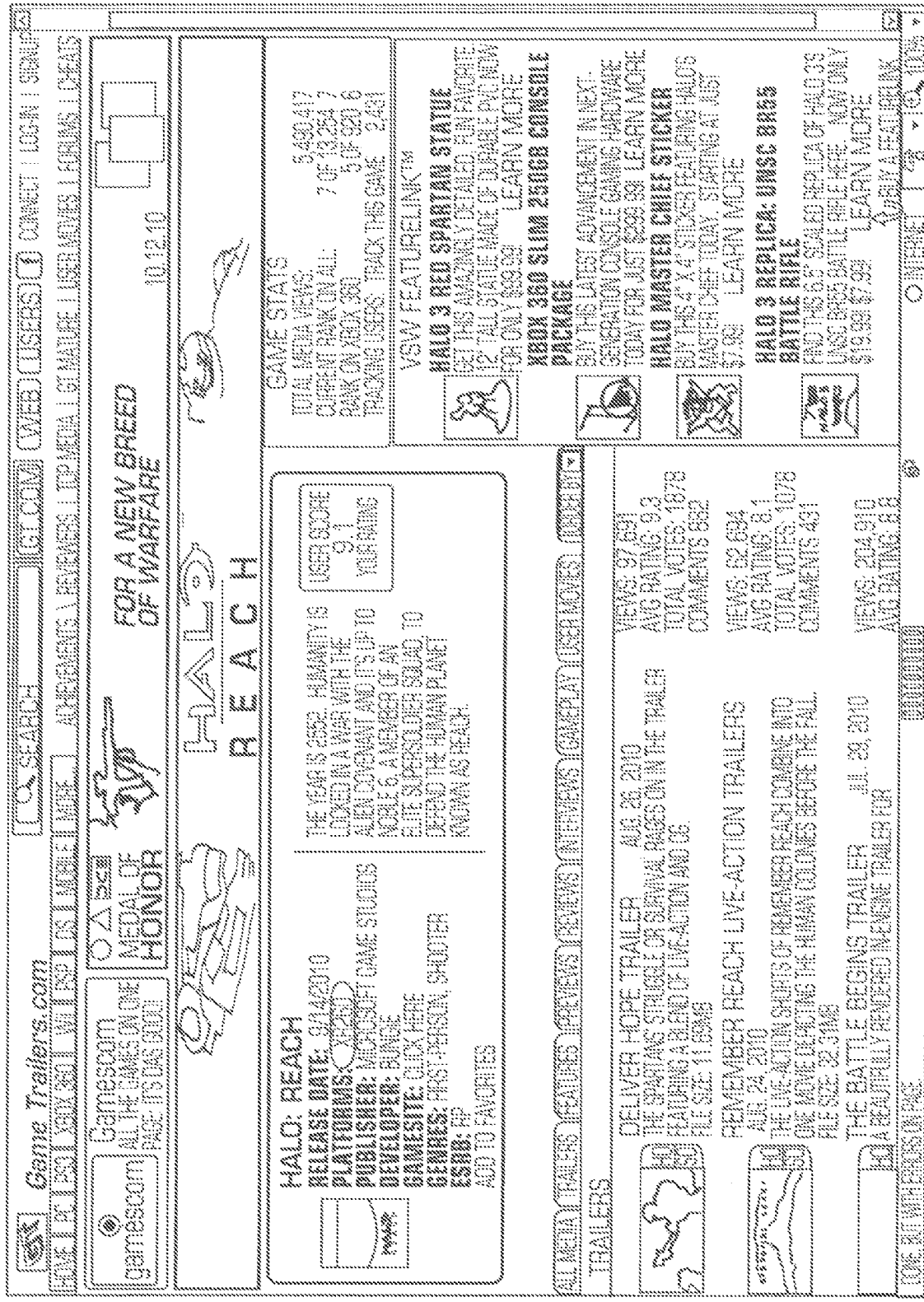
FIG. 15 illustrates a second example of a website with a piece of content and the real-time generated advertisements from the conceptual tagging and advertisement matching system including a Feature play feature.
Figure 16:
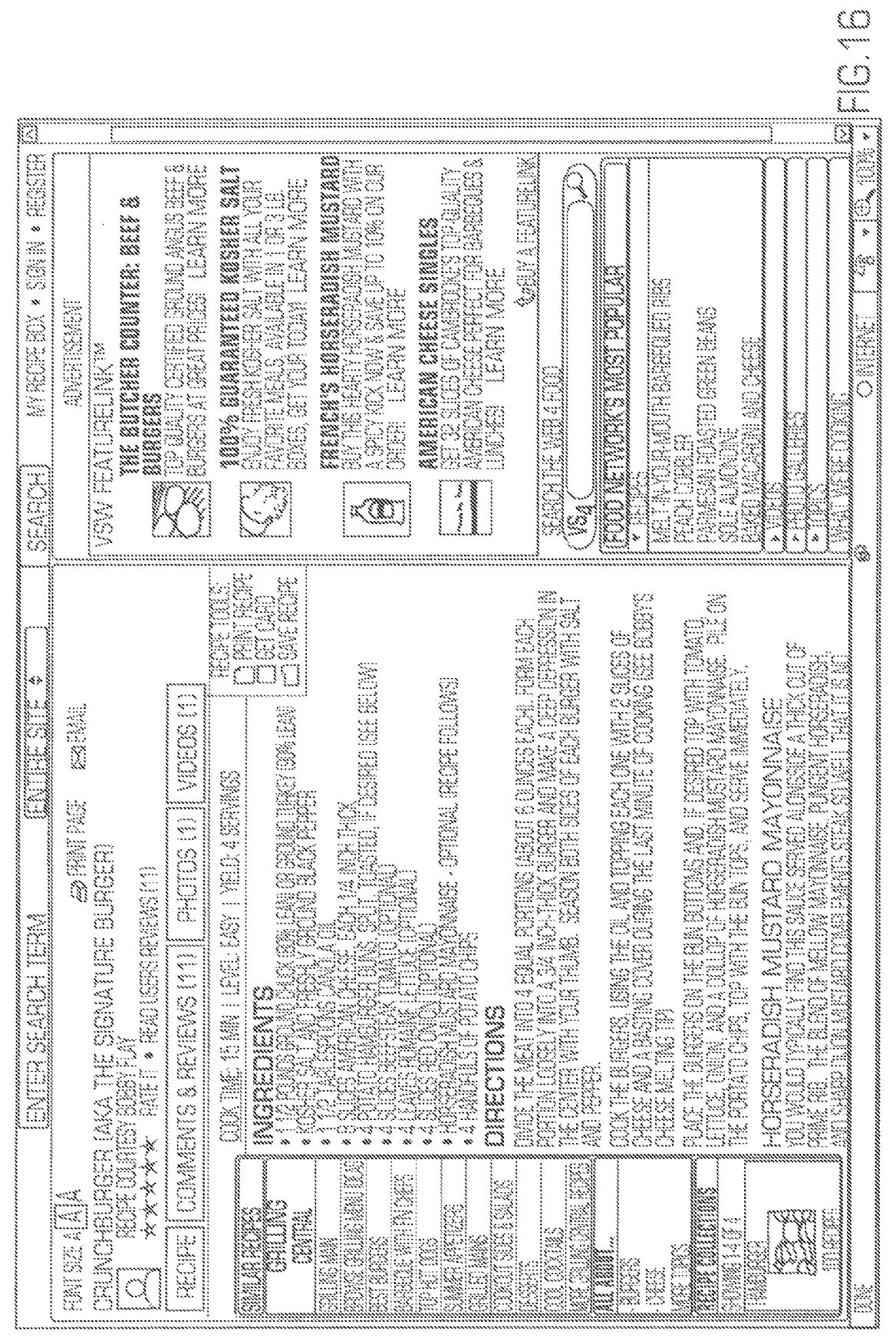

FIG. 13 illustrates an example of the piece of content being displayed with the matching advertisements using the conceptual tagging and advertisement matching system. In particular, the piece of content 500 (shown displayed in a web page in this example) is displayed in a frame that also has a message portion 502 (that can be located anywhere in relation to the piece of content) with one or more messages (502a, 502b, 502c, . . . 502n as shown in FIG. 13) wherein the messages may be advertisements, informational messages (like the wiki gardening example 502c) and other types of messages that have been selected by the system 100 based on the concepts in the piece of content. The system, however, is not limited to any particular topic area. Thus, as shown in FIGS. 14-16, the system 100 (that may be known as the FeatureLink system) may be used for a technology oriented customer, a gaming oriented customer and/or a cooking oriented customer of the system. Using the system 100, the technology site (which has an article about the Apple iPad) shows messages about the iPad, an iPad bag and a Kindle for example which are conceptually related to the iPad. Similarly, using the system 100, the gaming site (which has a summary of the new game Halo:Reach), shows messages about a Halo statue, the Xbox 360 console that can run the Halo game and the like. Using the system 100, the cooking site (that has a recipe for a Crunchburger) displays advertisements about places to purchase the different recipe ingredients since those advertisements match the concepts of the recipe.

Each message 502 as shown in FIG. 14, may have a hook portion 503 and a link portion 504. The hook portion 503 of the message may contain a title (that may be bolded as shown in the examples) and a short text piece that hooks the user to click on the link portion 504. In the example shown in FIG. 14, the link is entitled "Learn More" and launches a web page or another window (when the message is being provided to a browser such as in the example in FIG. 14) that contains more information about the product/service and how to purchase the product/service identified by the hook portion. In other embodiments, the link may perform other actions to provide the user with more information about the product/service and how to purchase the product/service identified by the hook portion. Furthermore, as shown in FIGS. 14 and 15, a message 502 returned to the customer's computer may also include a resource link 506 to a resource (wherein the resource is text, static images, animated images, an embedded video, an embedded audio, or an embedded interactive resource) so that the messages returned to the user who is looking at the piece of content can select the resource link and the resource which is pointed to by the resource link will be displayed/played for the user. For example, in the FIGS. 14 and 15, the resource link is to a video and the resource link is returned with the message so that the video pointed to by the resource link is displayed for the user if the user clicks on the resource link.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A system for providing messages based on concepts in a piece of content, the system comprising:
 a computer having a processing unit that executes that includes an indexer unit that receives one of a user requested piece of content and a message and extracts one or more features from one of the user requested piece of content and the message using an ontology,
 wherein the ontology comprises a set of synsets arranged in one or more taxonomies, a semantic network linking the synsets with typed relations, one or more facets having an identifier and classification rules to determine whether a document belongs to the facet and a declarative entity list having an entity extraction rule and a function to generate a corresponding identifier;
 a tag repository having a plurality of tags, wherein each tag is associated with one of the piece of content and the message, wherein each tag is determined from the one or more features extracted by the indexer unit; and
 the processing unit of the computer executing including a tag manager unit that receives a user requested piece of content, matches one or more messages to the user requested piece of content based on the plurality of tags in the tag repository, selects one or more messages from the one or more matched messages and delivers the one or more selected messages with the piece of content to a user.

2. The system of claim 1, wherein the indexer unit uses an ontology to extract features from one of the user requested piece of content and the message and wherein the ontology further comprises a set of synsets arranged in one or more taxonomies and a semantic network linking the synsets with typed relations.

3. The system of claim 1, wherein the hook further comprises one or more of text, static image, animated image, embedded video, embedded audio and embedded interactive resource.

4. The system of claim 2, wherein the one or more extracted features are one or more of words, phrases, concepts, dynamically extracted entities, and document classification facets from one of the user requested piece of content and the message.

5. The system of claim 2, wherein the one or more features extracted by the indexer unit are stored in the features repository as the plurality of tags.

6. The system of claim 1, wherein the tag manager unit further comprises a tagger unit that receives the one or more features extracted from one of the piece of content and the message and supplies the tag repository with a set of tags that are derived from the one or more extracted features.

7. The system of claim 6, wherein the tagger unit distinguishes pieces of content from messages and use this information during tag determination.

8. The system of claim 1, wherein the tag manager unit matches one or more messages to the user requested piece of content based on the similarity of the plurality of tags and selects one or more messages based on the similarity of the plurality of tags.

9. The system of claim 1, wherein the tag manager unit identifies that a tag has become stale.

10. The system of claim 9 further comprising a tagging queue wherein the tag manager unit sends a request to the tagging queue to generate one or more new tags for one of the user requested piece of content and the message.

11. The system of claim 10, wherein the tag manager unit sends a request to the tagging queue when one or more tags associated with one of the user requested piece of content and the message have become stale.

12. The system of claim 10, wherein the tag manager unit sends a request to the tagging queue when there are no tags associated with one of the user requested piece of content and the message.

13. The system of claim 1, wherein the tag manager unit selects one or more default messages for the user requested piece of content when the tag manager unit is unable to match sufficient messages.

14. The system of claim 1, wherein each message comprises a hook suitable for display alongside a piece of content and a resource link to a resource so that the resource is displayed when the resource link is selected by the user.

15. The system of claim 14, wherein the ontology further comprises one or more facets comprising an identifier and classification rules that determine whether a document belongs to the facet.

16. The system of claim 14, wherein the ontology further comprises a declarative entity list comprising an entity extraction rule and a function to generate a corresponding identifier.

17. The system of claim 1, wherein each message is an advertisement.

18. The system of claim 1, wherein the user requested piece of content is a piece of content on a webpage.

19. The system of claim 1, wherein each message is an advertisement and the user requested piece of content is a piece of content on a webpage.

20. The system of claim 1, wherein the message is a related article to the user requested piece of content.

21. The system of claim 1 further comprising an indexer repository that stores the extracted features.

22. The system of claim 1, wherein the extracted features are one or more of words, phrases, concepts, dynamically extracted entities, and document classification facets from one of the user requested piece of content and the message, and wherein the tag managing unit further comprises a tagger unit that receives the features extracted from one of the piece of content and the message and supplies the tag repository with a set of tags that are derived from the extracted features.

23. The system of claim 22, wherein the tag manager unit matches one or more messages to the user requested piece of content based on the similarity of a set of tags and selects one or more messages based on the similarity of a set of tags.

24. The system of claim 23, wherein each message further comprises an advertisement and the user requested piece of content is a piece of content on a webpage.

25. A method for providing messages based on concepts in a piece of content using an indexer unit and a tag manager unit, the method comprising:
   extracting, using the indexer unit, one or more features from one of a user requested piece of content and a message using ontology,
   wherein the ontology comprises a set of synsets arranged in one or more taxonomies, a semantic network linking the synsets with typed relations, one or more facets having an identifier and classification rules to determine whether a document belongs to the facet and a declarative entity list having an entity extraction rule and a function to generate a corresponding identifier;
   providing, in a tag repository, a plurality of tags, wherein each tag is associated with one of the piece of content and a message and each tag is determined from the extracted features;
   receiving, by the tag manager unit, a user requested piece of content;
   matching, using tag manager unit, one or more messages to the user requested piece of content based on the plurality of tags in the tag repository;
   selecting, using tag manager unit, one or more messages from the one or more matched messages; and
   delivering the one or more selected messages with the piece of content to a user.

26. The method of claim 25, wherein each message further comprises a hook suitable for display alongside a content and a resource link to a resource and wherein the method further comprising selecting, by a user, the resource link so that the resource is displayed to the user.

27. The method of claim 26, wherein the hook further comprises one or more of text, static image, animated image, embedded video, embedded audio and embedded interactive resource.

28. The method of claim 25, wherein the extracted features are one or more of words, phrases, concepts, dynamically extracted entities, and document classification facets from one of the user requested piece of content and the message.

29. The method of claim 28, wherein the extracted features are one or more of words, phrases, concepts, dynamically extracted entities, and document classification facets from one of the user requested piece of content and the message, and wherein the tag managing unit further comprises a tagger unit that receives the features extracted from one of the piece of content and the message and supplies the tag repository with a set of tags that are derived from the extracted features.

30. The system of claim 29, wherein the tag manager unit matches one or more messages to the user requested piece of content based on the similarity of a set of tags and selects one or more messages based on the similarity of a set of tags.

31. The system of claim 30, wherein each message further comprises an advertisement and the user requested piece of content is a piece of content on a webpage.

32. The method of claim 25 further comprising storing the features extracted by the indexer unit in the tag repository as the plurality of tags.

33. The method of claim 25 further comprising supplying, by a tagger unit, the tag repository with a set of tags that are derived from the extracted features.

34. The method of claim 33, wherein the tagger unit can distinguish content from messages and use this information during tag determination.

35. The method of claim 25, wherein matching the one or more messages comprising matching, using the tag manager unit, one or more messages to the user requested piece of content based on the similarity of a set of tags and wherein selecting the one or more messages further comprises selecting the one or more messages based on the similarity of a set of tags.

36. The method of claim 25 further comprising identifying, using the tag manager unit, a tag that has become stale.

37. The method of claim 36 further comprising sending a request to a tagging queue to generate one or more new tags for one of the user requested piece of content and the message.

38. The method of claim 37, wherein sending the request further comprises sending a request to the tagging queue when one or more tags associated with one of the user requested piece of content and the message have become stale.

39. The method of claim 38, wherein sending the request further comprises sending a request to the tagging queue when there are no tags associated with one of the user requested piece of content and the message.

40. The method of claim 25, wherein selecting the one or more messages comprises selecting one or more default messages for the user requested piece of content when the tag manage unit is unable to match sufficient messages.

41. The method of claim 25, wherein the ontology further comprises a set of synsets arranged in one or more taxonomies and a semantic network linking the synsets with typed relations.

42. The method of claim 25, wherein the ontology further comprises one or more facets comprising an identifier and classification rules that determine whether a document belongs to the facet.

43. The method of claim 25, wherein the ontology further comprises a declarative entity list comprising an entity extraction rule and a function to generate a corresponding identifier.

44. The method of claim 25, wherein each message further comprises an advertisement.

45. The method of claim 25, wherein the user requested piece of content is a piece of content on a webpage.

46. The method of claim 25, wherein each message further comprises an advertisement and the user requested piece of content is a piece of content on a webpage.

47. The method of claim 25, wherein the message further comprises a related article to the user requested piece of content.

48. The method of claim 25 further comprising storing the extracted features in an indexer repository.

\* \* \* \* \*